US011837719B2

(12) United States Patent
Jo et al.

(10) Patent No.: US 11,837,719 B2
(45) Date of Patent: Dec. 5, 2023

(54) LITHIUM COBALT-BASED POSITIVE ELECTRODE ACTIVE MATERIAL, PREPARATION METHOD THEREOF, POSITIVE ELECTRODE INCLUDING SAME, AND SECONDARY BATTERY INCLUDING POSITIVE ELECTRODE

(71) Applicant: LG Chem, Ltd., Seoul (KR)

(72) Inventors: Chi Ho Jo, Daejeon (KR); Min Kyu You, Daejeon (KR); Sung Bin Park, Daejeon (KR); Hyuck Hur, Daejeon (KR); Jin Tae Hwang, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 495 days.

(21) Appl. No.: 16/758,314

(22) PCT Filed: Nov. 13, 2018

(86) PCT No.: PCT/KR2018/013819
§ 371 (c)(1),
(2) Date: Apr. 22, 2020

(87) PCT Pub. No.: WO2019/093863
PCT Pub. Date: May 16, 2019

(65) Prior Publication Data
US 2020/0343537 A1  Oct. 29, 2020

(30) Foreign Application Priority Data

Nov. 13, 2017 (KR) .................... 10-2017-0150922
Nov. 13, 2018 (KR) .................... 10-2018-0138704

(51) Int. Cl.
*H01M 4/36* (2006.01)
*H01M 4/485* (2010.01)
*H01M 4/525* (2010.01)
*H01M 10/0525* (2010.01)
*C01G 51/00* (2006.01)
*H01M 4/02* (2006.01)

(52) U.S. Cl.
CPC ............ *H01M 4/366* (2013.01); *C01G 51/42* (2013.01); *H01M 4/485* (2013.01); *H01M 4/525* (2013.01); *H01M 10/0525* (2013.01); *C01P 2004/84* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| 6,395,426 B1 | 5/2002 | Imachi et al. |
| 9,786,903 B2 | 10/2017 | Ryu et al. |
| 2004/0258836 A1 * | 12/2004 | Besenhard ............ H01M 4/131 427/213 |
| 2008/0193846 A1 | 8/2008 | Morishima |
| 2010/0203388 A1 | 8/2010 | Kim et al. |
| 2013/0209885 A1 | 8/2013 | Paulsen et al. |
| 2014/0087254 A1 | 3/2014 | Li et al. |
| 2014/0087266 A1 | 3/2014 | Ll et al. |
| 2015/0056508 A1 | 2/2015 | Shin et al. |
| 2016/0351900 A1 * | 12/2016 | Sekiya ............. H01M 10/0567 |
| 2017/0222211 A1 * | 8/2017 | Ryu ..................... H01M 4/483 |
| 2017/0317342 A1 | 11/2017 | Kang et al. |
| 2019/0148711 A1 | 5/2019 | Jo et al. |

FOREIGN PATENT DOCUMENTS

| CN | 102569722 A | 7/2012 |
| CN | 102623694 A | 8/2012 |
| CN | 103700843 A | 4/2014 |
| CN | 103700850 A | 4/2014 |
| CN | 104466170 A | 3/2015 |
| CN | 106797049 A | 5/2017 |
| EP | 3439081 A1 | 2/2019 |
| JP | H10188982 A | 7/1998 |
| JP | 2000200605 A | 7/2000 |
| JP | 2003221234 A | 8/2003 |
| JP | 2004103566 A | 4/2004 |
| JP | 2008198465 A | 8/2008 |
| JP | 2008293788 A | 12/2008 |
| JP | 2008311132 A | 12/2008 |
| JP | 2013054926 A | 3/2013 |
| JP | 2015201432 A | 11/2015 |
| JP | 5849543 B2 | 1/2016 |
| JP | 2017084673 A | 5/2017 |
| JP | 2017152294 A | 8/2017 |

(Continued)

OTHER PUBLICATIONS

H. Cao, B. Xia, Y. Zhang, N. Xu. LiAlO2-coated LiCoO2 as cathode material for lithium ion batteries, Solid State Ionics 176 (2005) 911-914.*
International Search Report for Application No. PCT/KR2018/013819 dated Apr. 19, 2019, 2 pages.
Wang, et al., "Li2ZrO3 coated LiNi1/3Co1/3Mn1/3O2 for high performance cathode material in lithium batteries," Electrochimica Acta, Feb. 10, 2014, pp. 236-242, vol. 119.

(Continued)

*Primary Examiner* — Carlos Barcena
(74) *Attorney, Agent, or Firm* — Lerner David LLP

(57) ABSTRACT

A method for preparing a lithium cobalt-based positive electrode active material and a positive electrode active material prepared by the method are provided. The method includes dry-mixing and then heat treating a lithium cobalt oxide particle represented by Formula 1 and one or more lithium metal oxide particle selected from the group consisting of lithium aluminum oxide, lithium zirconium oxide, and lithium titanium oxide.

8 Claims, No Drawings

(56) References Cited

FOREIGN PATENT DOCUMENTS

| | | | |
|---|---|---|---|
| JP | 2017536648 A | 12/2017 | |
| KR | 20060040298 A | 5/2006 | |
| KR | 100693822 B1 | 3/2007 | |
| KR | 100743982 B1 | 7/2007 | |
| KR | 100889622 B1 | 3/2009 | |
| KR | 20130065694 A | 6/2013 | |
| KR | 101758992 B1 | 7/2017 | |
| WO | 2016053051 A1 | 4/2016 | |
| WO | 2018143612 A1 | 8/2018 | |

OTHER PUBLICATIONS

Wu, et al., "Solvothermal coating LiNi0.8Co0.15Al0.05O2 microspheres with nanoscale Li2TiO3 shell for long lifespan Li-ion battery cathode materials," Journal of Alloys and Compounds, Apr. 26, 2016, pp. 48-56, vol. 665.

Yi, et al., Effective enhancement of electrochemical performance for spherical spinel LiMn2O4 via Li ion conductive Li2ZrO3 coating, Electrochimica Acta, Jul. 10, 2014, pp. 143-149, vol. 134.

Search Report dated Dec. 6, 2021 from the Office Action for Chinese Application No. 2018800674566 dated Dec. 15, 2021, 4 pgs.

Cao H et al., "LiAlO2-coated LiCoO2 as cathode material for lithium ion batteries", Solid State Ionics, North Holland Pub. Company. Amsterdam, NL, vol. 176. No. 9-10, Mar. 15, 2005, pp. 911-914.

Zhang Jicheng et al., "Unraveling the multiple effects of Li2ZrO3 coating on the structural and electrochemical performances of LiCoO2 as high-voltage cathode materials", Electrochimica Acta, Elsevier, Amsterdam, NL, vol. 209, May 10, 2016, pp. 102-110.

Extended European Search Report including Written Opinion for EP18875086.3 dated Nov. 6, 2020; 8 pages.

* cited by examiner

LITHIUM COBALT-BASED POSITIVE ELECTRODE ACTIVE MATERIAL, PREPARATION METHOD THEREOF, POSITIVE ELECTRODE INCLUDING SAME, AND SECONDARY BATTERY INCLUDING POSITIVE ELECTRODE

CROSS-REFERENCE TO RELATED APPLICATIONS

The present application is a national stage entry under 35 U.S.C. § 371 of PCT/KR2018/013819 filed on Nov. 13, 2018, which claims priority to Korean Patent Application Nos. 10-2017-0150922, filed on Nov. 13, 2017, and 10-2018-0138704, filed on Nov. 13, 2018, in the Korean Intellectual Property Office, the disclosures of which are incorporated herein in their entirety by reference.

TECHNICAL FIELD

The present invention relates to a lithium cobalt-based positive electrode active material, a preparation method thereof, a positive electrode including the same, and a lithium secondary battery including the positive electrode, and more specifically, to a lithium cobalt-based positive electrode active material capable of implementing excellent high-temperature storage properties by suppressing cobalt elution even during a high-voltage driving of 4.45 V or greater, a preparation method thereof, a positive electrode including the same, and a lithium secondary battery including the positive electrode.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

One example of positive electrode active materials for a lithium secondary battery which has been actively developed and used is $LiCoO_2$ of a layered structure. $LiCoO_2$ is most widely used since the synthesis thereof is easily achieved and the electrochemical performance thereof, including lifespan properties, is excellent. However, due to the poor structural stability thereof, there is a limitation in applying $LiCoO_2$ to a high capacity battery technology.

Therefore, a technology of improving the structural stability of a lithium cobalt oxide by coating a metal oxide such as Al and Zr on the surface of a lithium cobalt oxide particle has been proposed. A lithium cobalt oxide coated with a metal oxide as described above exhibited excellent electrochemical performance in a battery having a driving voltage of less than 4.45 V. However, according to the studies of the present inventors, when a lithium cobalt oxide coated with a metal oxide is applied to a battery having a driving voltage of 4.45 V or greater, the generation of gas and cobalt elution rapidly occurred, and thus the lifespan properties and high-temperature storage properties were significantly deteriorated.

When coating a metal oxide, lithium is reacted on the surface of the metal oxide and a lithium cobalt oxide, thereby forming a lithium defect layer having a molar ratio of Li/co of less than 1 on the surface of the lithium cobalt oxide. When such lithium defect layer is present, lifespan properties and output properties are improved. However, due to an increase in reactivity with an electrolyte, the generation of gas and cobalt elution occurs during a high-voltage driving, and high-temperature storage properties are deteriorated.

DISCLOSURE OF THE INVENTION

Technical Problem

An aspect of the present invention provides a lithium cobalt-based positive electrode active material capable of effectively suppressing cobalt elution even during a driving at a high voltage of 4.45 V or greater.

Technical Solution

According to an aspect of the present invention, there is provided a method for preparing a lithium cobalt-based positive electrode active material, the method including dry-mixing and then heat treating a lithium cobalt oxide particle represented by Formula 1 below and a lithium metal oxide particle.

$LiCo_{1-x}M_xO_2$     [Formula 1]

In Formula 1, M is one or more selected from the group consisting of Al, Mg, W, Mo, Zr, Ti, Fe, V, Cr, Ba, Ca, and Nb, and $0 \leq x \leq 0.2$.

At this time, the lithium metal oxide particle may be one or more selected from the group consisting of lithium aluminum oxide, lithium zirconium oxide, and lithium titanium oxide.

It is preferable that the heat treating is performed at 300° C. to 800° C.

It is preferable that the lithium metal oxide particle is mixed in an amount of 0.01-0.5 parts by weight based on 100 parts by weight of the total weight of the lithium cobalt oxide particle and the lithium metal oxide particle.

According to an aspect of the present invention, there is provided a lithium cobalt-based positive electrode active material including a lithium cobalt-based oxide particle represented by Formula 1 below and a coating layer formed on the lithium cobalt-based oxide particle and including a lithium metal oxide, wherein the atomic ratio of Li/Co in an interface between the lithium cobalt-based oxide particle and the coating layer and in the coating layer is 1 or greater.

$LiCo_{1-x}M_xO_2$     [Formula 1]

In Formula 1, M is one or more selected from the group consisting of Al, Mg, W, Mo, Zr, Ti, Fe, V, Cr, Ba, Ca, and Nb, and $0 \leq x \leq 0.2$.

Meanwhile, the cobalt elution amount measured for a secondary battery to which the positive electrode active material is applied, and which is charged to 4.5 V and then stored for two weeks at 60° C., may be 700 ppm.

Also, the lithium metal oxide may be included in an amount of 0.01-0.5 parts by weight based on 100 parts by weight of the total positive electrode active material.

Meanwhile, the positive electrode active material of the present invention may be prepared by the method for preparing a positive electrode active material of the present invention described above.

According to yet an aspect of the present invention, there is provided a positive electrode including the positive electrode active material according to the present invention and a lithium secondary battery including the positive electrode.

Advantageous Effects

According to the preparation method of the present invention, by using a lithium metal oxide as a coating raw material, lithium in a lithium cobalt oxide is prevented from being consumed by a reaction with the coating raw material when coating is performed, so that a lithium defect layer is prevented from being formed on the surface of the lithium cobalt oxide. Accordingly, the generation of gas and cobalt elution caused by the presence of the lithium defect layer may be effectively suppressed during a high-voltage driving of 4.45 V or greater.

In addition, the positive electrode active material of the present invention has small cobalt elution amount during high-temperature storage even after high-voltage charging, thereby exhibiting excellent electrochemical properties.

BEST MODE FOR CARRYING OUT THE INVENTION

Hereinafter, the present invention will be described in more detail.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present inventors have conducted intensive research on developing a lithium cobalt-based positive electrode active material capable of effectively suppressing the generation of gas and cobalt elution even during a driving at a high voltage of 4.45 V or greater. As a result, the present inventors have found that when a lithium cobalt-based positive electrode active material is prepared using a lithium metal oxide as a coating raw material of a lithium cobalt oxide, the formation of a lithium defect layer is suppressed, so that excellent electrochemical properties and high-temperature storage properties may be implemented even in a battery having a driving voltage of 4.45 V or greater, and have completed the present invention.

Method for Preparing Lithium Cobalt-Based Positive Electrode Active Material

First, a method for preparing a lithium cobalt-based positive electrode active material according to the present invention will be described.

The method for preparing a lithium cobalt-based positive electrode active material according to the present invention includes dry-mixing and then heat treating a lithium cobalt oxide particle and a lithium metal oxide particle.

In the present invention, the lithium cobalt oxide particle may be represented by Formula 1 below.

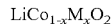

$$LiCo_{1-x}M_xO_2 \qquad \text{[Formula 1]}$$

In Formula 1, M is a doping element, and may be one or more selected from the group consisting of Al, Mg, W, Mo, Zr, Ti, Fe, V, Cr, Ba, Ca, and Nb. Preferably the M may be Mg, Ti, or a combination thereof.

The x represents the atomic ratio of a doping element in the lithium cobalt oxide particle, and may be 0≤x≤0.2. Preferably, the x may be 0≤x≤0.1.

The lithium cobalt oxide particle represented by Formula 1 may be a commercially available lithium cobalt oxide particle purchased to be used, or may be one prepared by a method for preparing a lithium cobalt oxide, the method well known in the art. For example, the lithium cobalt oxide particle represented by Formula 1 may be prepared by mixing a cobalt raw material, a lithium raw material, and optionally, a doping element raw material in an amount satisfying a stoichiometric ratio, followed by firing.

At this time, the cobalt raw material may be, for example, an oxide, a hydroxide, an oxyhydroxide, a halide, a nitrate, a carbonate, an acetate, an oxalate, a citrate, or a sulfate, and the like, all containing cobalt, more specifically $Co(OH)_2$, $Co_2O_4$, CoOOH, $Co(OCOCH_3)_2 \cdot 4H_2O$, $Co(NO_3)_2 \cdot 6H_2O$, or $Co(SO_4)_2 \cdot 7H_2O$, and the like, and any one thereof or a mixture of two or more thereof may be used.

The lithium-containing raw material may be, for example, an oxide, a hydroxide, an oxyhydroxide, a halide, a nitrate, a carbonate, an acetate, an oxalate, a citrate, or a sulfate, and the like, all containing lithium, more specifically $Li_2CO_3$, $LiNO_3$, $LiNO_2$, LiOH, $LiOH \cdot H_2O$, LiH, LiF, LiCl, LiBr, LiI, $Li_2O$, $Li_2SO_4$, $CH_3COOLi$, or $Li_3C_6H_6O_7$, and the like, all containing lithium, and any one thereof or a mixture of two or more thereof may be used.

The doping element raw material may be one or more metals selected from the group consisting of Al, Mg, W, Mo, Zr, Ti, Fe, V, Cr, Ba, Ca, and Nb, or an oxide, a hydroxide, an oxyhydroxide, a halide, a nitrate, a carbonate an acetate, an oxalate, a citrate, or a sulfate, and the like, all containing the same. Any one thereof or a mixture of two or more thereof may be used.

Meanwhile, the firing may be performed in a temperature range of 500-1100° C., preferably 700-900° C., and may be performed in the atmosphere or in an oxygen atmosphere. It is preferable that the firing is performed for 6 hours to 18 hours, preferably 8 hours to 12 hours.

Next, the lithium metal oxide particle is to form a coating layer on a lithium cobalt oxide particle to prevent the lithium cobalt oxide particle from being in direct contact with an electrolyte, and may be, for example, one or more selected from the group consisting of lithium aluminum oxide, lithium zirconium oxide, and lithium titanium oxide.

Typically, a metal oxide particle has been mainly used for the formation of a coating layer of a lithium cobalt oxide. However, when the coating layer is formed by using the metal oxide particle, lithium in the lithium cobalt oxide is consumed by reacting with the metal oxide when forming the coating layer, so that a lithium defect layer is formed on the surface of the lithium cobalt oxide. When a lithium cobalt-based positive electrode active material in which the lithium defect layer is present as described above was applied to a battery having a driving voltage of less than 4.4 v, there was no significant problem. However, when applied to a battery having a driving voltage of 4.45 V or greater, there were problems in that the generation of gas and cobalt elution were rapidly increased so that battery performance was significantly reduced.

However, when a lithium metal oxide is used as a coating raw material as in the present invention, since the coating raw material itself contains lithium, lithium in a lithium cobalt oxide is not consumed when forming a coating layer, so that a lithium defect layer is not formed. Accordingly, even when applied to a battery having a driving voltage of 4.45 V or greater, the generation of gas and cobalt elution are suppressed, so that excellent battery performance may be implemented.

Meanwhile, it is preferable that the lithium metal oxide particle is mixed in an amount of 0.01-0.5 parts by weight, preferably 0.04-0.2 parts by weight based on 100 parts by weight of the total weight of the lithium cobalt oxide particle and the lithium metal oxide particle. When the mixing amount of the lithium metal oxide particle satisfies the above range, the effect of reducing cobalt elution may be sufficiently achieved by suppressing a reaction with an electrolyte. Specifically, when the content of the lithium metal oxide is less than the above range, the effect of reducing cobalt elution is not sufficient, and when greater than the above range, the deterioration of capacity and the increase in surface resistance may occur.

Meanwhile, in the present invention, it is preferable that the lithium cobalt oxide particle and the lithium metal oxide particle are mixed by a dry-mixing method in which a solvent is not used. When a wet process is used to disperse the lithium metal oxide, which is used as a coating raw material of the present invention, in a solvent, lithium metal oxide particles are agglomerated to form a non-uniform coating layer, thereby reducing the effect of suppressing cobalt elution.

Meanwhile, it is preferable that the heat treatment is performed at 300° C. to 800° C., preferably 500° C. to 800° C., more preferably 600° C. to 800° C. When the heat treatment temperature satisfies the above range, the lithium metal oxide does not react with lithium in the lithium cobalt oxide and the loss of lithium due do the heat treatment is prevented, so that the formation of a lithium defect layer may be effectively prevented.

Also, it is preferable that the heat treatment is performed for 1-10 hours, preferably 1-8 hours, more preferably 2-5 hours. When the heat treatment duration satisfies the above range, the lithium metal oxide does not react with lithium in the lithium cobalt oxide and the loss of lithium due do the heat treatment is prevented, so that the formation of a lithium defect layer may be effectively prevented.

The positive electrode active material according to the present invention prepared as described above has no lithium defect layer present on the surface of the lithium cobalt oxide particle, and thus, when applied to a battery having a driving voltage of 4.45 V or greater, the generation of gas and cobalt elution are suppressed.

Lithium Cobalt-Based Positive Electrode Active Material

Next, a lithium cobalt-based positive electrode active material according to the present invention will be described.

The lithium cobalt-based positive electrode active material prepared according to the present invention includes a lithium cobalt-based oxide particle represented by Formula 1 below and a coating layer formed on the lithium cobalt-based oxide particle and including a lithium metal oxide.

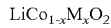 [Formula 1]

$$LiCo_{1-x}M_xO_2$$

In Formula 1, M is a doping element, and may be one or more selected from the group consisting of Al, Mg, W, Mo, Zr, Ti, Fe, V, Cr, Ba, Ca, and Nb. Preferably the M may be Mg, Ti, or a combination thereof.

The x represents the molar ratio of a doping element in the lithium cobalt oxide particle, and may be $0 \leq x \leq 0.2$. Preferably, the x may be $0 \leq x \leq 0.1$.

The coating layer is formed by dry-mixing and then heat treating a lithium metal oxide particle and the lithium cobalt oxide particle. The coating layer is formed on the surface of the lithium cobalt-based oxide particle and includes a lithium metal oxide. The lithium metal oxide may be, for example, one or more selected from the group consisting of lithium aluminum oxide, lithium zirconium oxide, and lithium titanium oxide.

Meanwhile, the lithium metal oxide may be included in an amount of 0.01-0.5 parts by weight, preferably 0.04-0.2 parts by weight based on 100 parts by weight of the total positive electrode active material. When the content of the lithium metal oxide satisfies the above range, the effect of reducing cobalt elution may be sufficiently achieved by suppressing a reaction with an electrolyte. Specifically, when the content of the lithium metal oxide is less than the above range, the effect of reducing cobalt elution is not sufficient, and when greater than the above range, the deterioration of capacity and the increase in surface resistance may occur.

Meanwhile, the positive electrode active material according to the present invention is prepared by using a lithium metal oxide as a coating raw material and performing a heat treatment at a relatively low temperature, so that lithium in a lithium cobalt oxide does not react with the coating raw material, and thus a lithium defect layer having an atomic ratio of lithium Li/Co of less than 1 is not included. That is, the positive electrode active material according to the present invention has an atomic ratio of Li/Co of 1 or higher on a surface portion. At this time, the surface portion refers to a region adjacent to the surface of a positive electrode active material particle, and is a region including an interface between the lithium cobalt-based oxide particle and the coating layer, and the coating layer. Although not limited thereto, the surface portion may refer to a region having a thickness of 1-100 nm, preferably 1-50 nm from the outermost surface of the positive electrode active material particle toward the center. The Li/Co atomic ratio of the positive electrode active material particle may be measured by various component analysis methods known in the art, for example X-ray photoelectron Spectroscopy (XPS), Transmission Electron Microscopy (TEM), Energy Disperive x-ray spectroscopy (EDS), Inductively Coupled Plasma-Atomic Emission Spectrometer (ICP-AES), Time of Flight Secondary Ion Mass Spectrometry (ToF-SIMS), and the like.

As described above, the positive electrode active material according to the present invention has no lithium defect layer, thereby having excellent structural stability, and when applied to a battery having a driving voltage of 4.45 V or greater, the generation of gas and cobalt elution are suppressed. Particularly, even when the positive electrode active material according to the present invention stored at a high temperature after high-voltage charging, the effect of suppressing cobalt elution is excellent. Specifically, the cobalt elution amount measured for a secondary battery to which the positive electrode active material according to the present invention is applied, and which is charged to 4.5 V and then stored for two weeks at 60° C., is 700 ppm or less, preferably 600 ppm or less, more preferably 500 ppm or less.

Meanwhile, the positive electrode active material according to the present invention may include lithium in a constant concentration regardless of the position inside the particle, or may have a concentration gradient gradually increasing from the surface of the active material particle to the center. When the lithium is distributed in the positive electrode active material to have a concentration gradient, the concentration gradient may be in the form of a primary function or a secondary function which varies depending on the thickness of the particle in a direction from the center of the active material particle to the surface.

The concentration of the positive electrode active material may be measured by various component analysis methods known in the art, for example X-ray photoelectron Spectroscopy (XPS), Transmission Electron Microscopy (TEM), Energy Disperive x-ray spectroscopy (EDS), Inductively Coupled Plasma-Atomic Emission Spectrometry (ICP-AES), Time of Flight Secondary Ion Mass Spectrometry (ToF-SIMS), and the like.

The positive electrode active material according to the present invention may have an average particle diameter ($D_{50}$) of 3 μm to 50 μm, preferably 10 μm to 50 μm. When the average particle diameter ($D_{50}$) of the positive electrode active material satisfies the above range, an appropriate specific surface area and an appropriate positive electrode mixture density may be implemented. At this time, the average particle diameter ($D_{50}$) of the positive electrode active material refers to a particle diameter at 50% in a cumulative volume distribution, and may be, for example, measured by a laser diffraction method. Specifically, the positive electrode active material particles are dispersed in a dispersion medium, and then introduced to a commercially available laser diffraction particle size measurement device (for example, Microtrac MT 3000) to be irradiated with an ultrasonic wave of about 28 kHz to an output of 60 W. Thereafter, the particle diameter may be measured at 50% in cumulative volume distribution.

Positive Electrode and Lithium Secondary Battery

Next, a positive electrode according to the present invention will be described.

The positive electrode active material according to the present invention may be usefully used for manufacturing a positive electrode for a secondary battery.

Specifically, a positive electrode for a secondary battery according to the present invention includes a positive electrode current collector, and a positive electrode active material layer formed on the positive electrode current collector. At this time, the positive electrode active material layer includes the positive electrode active material according to the present invention.

The positive electrode may be manufactured according to a typical manufacturing method of a positive electrode except that the positive electrode active material according to the present invention is used. For example, the positive electrode may be manufactured by manufacturing a positive electrode mixture by dissolving or dispersing components constituting a positive electrode active material layer, which are a positive electrode active material, a conductive material and/or a binder, in a solvent, applying the mixture on at least one surface of a positive electrode current collector, followed by drying and then roll-pressing. Alternatively, the positive electrode may be manufactured by casting the positive electrode mixture on a separate support, and then laminating a film peeled off from the support on the positive electrode current collector.

At this time, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, a non-woven body, and the like.

On at least one surface of the current collector, a positive electrode active material layer including the positive electrode active material according to the present invention, and when necessary, further including at least one of a conductive material or a binder optionally is disposed.

The positive electrode active material includes the positive electrode active material according to the present invention, and may be included in an amount of 80-99 wt %, more specifically 85-98 wt % based on the total weight of the positive electrode active material layer. When included in the above content range, excellent capacity properties may be exhibited.

The conductive material is used to impart conductivity to an electrode, and any conductive material may be used without particular limitation as long as it has electronic conductivity without causing a chemical change in a battery to be constituted. Specific examples of the conductive material may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

Also, the binder serves to improve the bonding between positive electrode active material particles and the adhesion between the positive electrode active material and the current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

Meanwhile, the solvent used for preparing the positive electrode mixture may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, and the like of a slurry.

Next, a secondary battery according to the present invention will be described.

The secondary battery according to the present invention includes a positive electrode, a negative electrode disposed to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical manufacturing method of a negative electrode known in the art. For example, the negative electrode may be manufactured by manufacturing a negative electrode mixture by dissolving or dispersing components constituting a negative electrode active material layer, which are a negative electrode active material, a conductive material and/or a binder, in a solvent, applying the mixture on at least one surface of a negative electrode current collector, followed by drying and then roll-pressing.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 μm to 500 μm, and as in the case of the positive electrode current collector, microscopic irregularities may be formed on the surface of the negative electrode current collector to improve the adhesion of the negative electrode active material. For example, the negative electrode current collector may be used in various forms such as a film, a sheet, a foil, a net, a porous body, a foam, a non-woven body, and the like.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_v(0<v<2)$, $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, a meso-carbon microbead, a mesophase pitch, and high-temperature sintered carbon such as petroleum or a coal tar pitch derived coke.

Also, the binder and the conductive material may be the same as those described above in the description of the positive electrode.

Meanwhile, in the secondary battery, the separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used as the organic solvent without particular limitation as long as it may serve as a medium through which ions involved in an electrochemical reaction of the battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, when the cyclic carbonate and the chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in addition to the above electrolyte components. At this time, the additive may be included in an amount of 0.1 wt % to 5 wt % based on the total weight of the electrolyte.

As described above, a secondary battery including the positive electrode active material according to the present invention has excellent capacity properties and thermal stability, and thus, may be usefully applied to portable devices such as a mobile phone, a notebook computer, and a digital camera, and to electric cars such as a hybrid electric vehicle (HEV). Particularly, the secondary battery according to the present invention may be used as a high-voltage battery of 4.45 V or greater.

In addition, the secondary battery according to the present invention may be used as a unit cell of a battery module, and the battery module may be applied to a battery pack. The battery module or the battery pack may be used as a power source of at least one medium-and-large sized device such as a power tool; electric cars including an electric vehicle (EV), a hybrid electric vehicle (HEV), and a plug-in hybrid electric vehicle (PHEV); or a power storage system.

MODE FOR CARRYING OUT THE INVENTION

Hereinafter, examples of the present invention will be described in detail so that those skilled in the art can easily carry out the present invention. The present invention may, however, be embodied in many different forms and is not limited to the examples set forth herein.

Example 1

100 parts by weight of $LiCoO_2$ powder and 0.07 parts by weight of $LiAlO_2$ powder were solid mixed, and then the mixture was heat-treated for 4 hours at 700° C. to prepare a lithium cobalt-based positive electrode active material in which the $LiAlO_2$ is coated on the $LiCoO_2$.

Example 2

100 parts by weight of $LiCoO_2$ powder and 0.05 parts by weight of $Li_2ZrO_3$ powder were solid mixed, and then the mixture was heat-treated for 5 hours at 750° C. to prepare a lithium cobalt-based positive electrode active material in which the $Li_2ZrO_3$ is coated on the $LiCoO_2$.

Example 3

100 parts by weight of $LiCoO_2$ powder and 0.05 parts by weight of $Li_2TiO_3$ powder were solid mixed, and then the mixture was heat-treated for 5 hours at 750° C. to prepare a lithium cobalt-based positive electrode active material in which the $Li_2TiO_3$ is coated on the $LiCoO_2$.

Comparative Example 1

A lithium cobalt-based positive electrode active material was prepared in the same manner as in Example 1 except that $Al_2O_3$ was used instead of $LiAlO_2$ powder.

Comparative Example 2

A lithium cobalt-based positive electrode active material was prepared in the same manner as in Example 2 except that $ZrO_2$ was used instead of $Li_2ZrO_3$ powder.

Comparative Example 3

A lithium cobalt-based positive electrode active material was prepared in the same manner as in Example 3 except that $TiO_2$ was used instead of $Li_2TiO_3$ powder.

Comparative Example 4

100 parts by weight of $LiCoO_2$ powder and 0.07 parts by weight of $LiAlO_2$ powder were added to an ethanol solvent and mixed therewith, and then the mixture was heat-treated for 5 hours at 650° C. to prepare a lithium cobalt-based positive electrode active material.

Experimental Example 1

The positive electrode active material prepared in each of Examples 1-3 and Comparative Examples 1-4 was used to manufacture a lithium secondary battery.

Specifically, the positive electrode active material prepared in each of Examples 1-3 and Comparative Examples 1-4, carbon black as a conductive material, and PVdF as a binder were mixed in N-methylpyrrolidone, which is a solvent, at a weight ratio of 90:5:5 to prepare positive electrode mixtures (viscosity: 5000 mPa·s), and the mixtures were applied on aluminum current collectors, dried, and roll-pressed to manufacture positive electrodes.

Also, artificial graphite, mesocarbon microbead (MCMB), as a negative electrode active material, carbon black as a conductive material, and PVdF as a binder were mixed in N-methylpyrrolidone, which is a solvent, at a weight ratio of 85:10:5 to prepare a negative electrode mixture, and the mixture was applied on a copper current collector, dried, and roll-pressed to manufacture a negative electrode.

A porous polyethylene separator was interposed between each of the positive electrodes and the negative electrode which were prepared as described above to prepare electrode assemblies, and then the electrode assemblies each were placed inside a battery case. Thereafter, an electrolyte was injected into each of the cases to manufacture coin cells. At this time, the electrolyte was prepared by dissolving lithium hexafluorophosphate having a concentration of 1.15 M in an organic solvent in which ethylene carbonate/dimethyl carbonate/ethylmethyl carbonate were mixed in a volume ratio of 3:4:3.

The coin cells manufactured as described above were charged at 4.5 V. After the charging, the positive electrode was separated, and then washed with a dichloromethane (DCM) solution. Thereafter, the washed positive electrode was placed in a Nalgene bottle with 4 mL of an electrolyte. In order to prevent the electrolyte from being evaporated, the Nalgene bottle was completely sealed with a Parafilm and an aluminum pouch, and the sealed bottle was stored in a chamber at 60° C. for two weeks. Two weeks later, in order to extract only the electrolyte, the positive electrode active material that may be present as a floating matter in the electrolyte was completely removed using a sealing paper filter, and then the electrolyte was evaporated to measure the amount of cobalt present in the electrolyte (that is, the cobalt elution amount) by ICP analysis. The ICP analysis was performed using inductively coupled plasma light-emission spectrometer (ICP-OES; Optima 7300DV, PerkinElmer Co.). Meanwhile, in order to reduce the deviation between cells, 4 coin cells were manufactured for each Examples and Comparative Examples, and the cobalt elution amount of the 4 coin cells was measured to calculate an average value. The measurement results are shown in Table 1 below.

TABLE 1

|  | Cobalt elution amount (ppm) |
|---|---|
| Example 1 | 496 |
| Example 2 | 591 |
| Example 3 | 559 |

TABLE 1-continued

| | Cobalt elution amount (ppm) |
|---|---|
| Comparative Example 1 | 857 |
| Comparative Example 2 | 828 |
| Comparative Example 3 | 1057 |
| Comparative Example 4 | 842 |

As shown in Table 1, the cobalt elution amount of the coin cells of Examples 1-3 in which a positive electrode active material with a coating layer formed with a lithium metal oxide particle was significantly smaller than the cobalt elution amount of the coin cells of Comparative Examples 1-4.

The invention claimed is:

1. A lithium cobalt-based positive electrode active material comprising:
   a lithium cobalt-based oxide particle represented by Formula 1 below; and
   a coating layer formed on the lithium cobalt-based oxide particle, wherein the coating layer includes lithium aluminum oxide, wherein an atomic ratio of Li/Co in an interface between the lithium cobalt-based oxide particle and the coating layer and in the coating layer is 1 or greater:

$$LiCo_{1-x}M_xO_2 \quad \text{[Formula 1]}$$

wherein, M is one or more selected from the group consisting of Al, Mg, W, Mo, Zr, Ti, Fe, V, Cr, Ba, Ca, and Nb, and $0 \leq x \leq 0.2$, and
   wherein a cobalt elution amount is 700 ppm or less when the cobalt elution amount is measured for a secondary battery to which the lithium cobalt-based positive electrode active material is applied, and which is charged to 4.5 V and then stored for two weeks at 60° C.

2. The lithium cobalt-based positive electrode active material of claim 1, wherein the lithium metal oxide is included in an amount of 0.01-0.5 parts by weight based on 100 parts by weight of a total positive electrode active material.

3. A positive electrode comprising the positive electrode active material according to claim 1.

4. A lithium secondary battery comprising the positive electrode of claim 3.

5. A lithium secondary battery of claim 4, wherein a driving voltage of the lithium secondary battery is 4.45 V or greater.

6. A method for preparing a lithium cobalt-based positive electrode active material, comprising:
   dry-mixing and then heat treating a lithium cobalt oxide particle represented by Formula 1 below and a lithium metal oxide particle, to form a lithium cobalt particle having a coating layer formed thereon,
   wherein the lithium metal oxide particle includes lithium aluminum oxide,
   wherein an atomic ratio of Li/Co in an interface between the lithium cobalt-based oxide particle and the coating layer and in the coating layer is 1 or greater, and
   wherein a cobalt elution amount is 700 ppm or less when the cobalt elution amount is measured for a secondary battery to which the lithium cobalt-based positive electrode active material is applied, and which is charged to 4.5 V and then stored for two weeks at 60° C.:

$$LiCo_{1-x}M_xO_2 \quad \text{[Formula 1]}$$

wherein, M is one or more selected from the group consisting of Al, Mg, W, Mo, Zr, Ti, Fe, V, Cr, Ba, Ca, and Nb, and $0 \leq x \leq 0.2$.

7. The method of claim 6, wherein the heat treating is performed at 300° C. to 800° C.

8. The method of claim 6, wherein the lithium metal oxide particle is mixed in an amount of 0.01-0.5 parts by weight based on 100 parts by weight of a total weight of the lithium cobalt oxide particle and the lithium metal oxide particle.

* * * * *